(No Model.)

J. T. BALTIMORE & J. F. PADDLEFORD.
SWINGING GATE.

No. 337,360. Patented Mar. 9, 1886.

Witnesses
M. E. Fowler
J. W. Garner

Inventors:
J. T. Baltimore, and
J. F. Paddleford.
By their Attorneys
C. A. Snow & Co.

UNITED STATES PATENT OFFICE.

JOHN T. BALTIMORE AND JOHN F. PADDLEFORD, OF NORA SPRINGS, IOWA.

SWINGING GATE.

SPECIFICATION forming part of Letters Patent No. 337,360, dated March 9, 1886.

Application filed November 7, 1885. Serial No. 182,130. (No model.)

*To all whom it may concern:*

Be it known that we, JOHN T. BALTIMORE and JOHN F. PADDLEFORD, citizens of the United States, residing at Nora Springs, in the county of Floyd and State of Iowa, have invented a new and useful Improvement in Swinging Gates, of which the following is a specification, reference being had to the accompanying drawings.

Our invention relates to an improvement in swinging gates; and it consists in the peculiar construction and combination of devices that will be more fully set forth hereinafter, and particularly pointed out in the claims.

Figure 1:
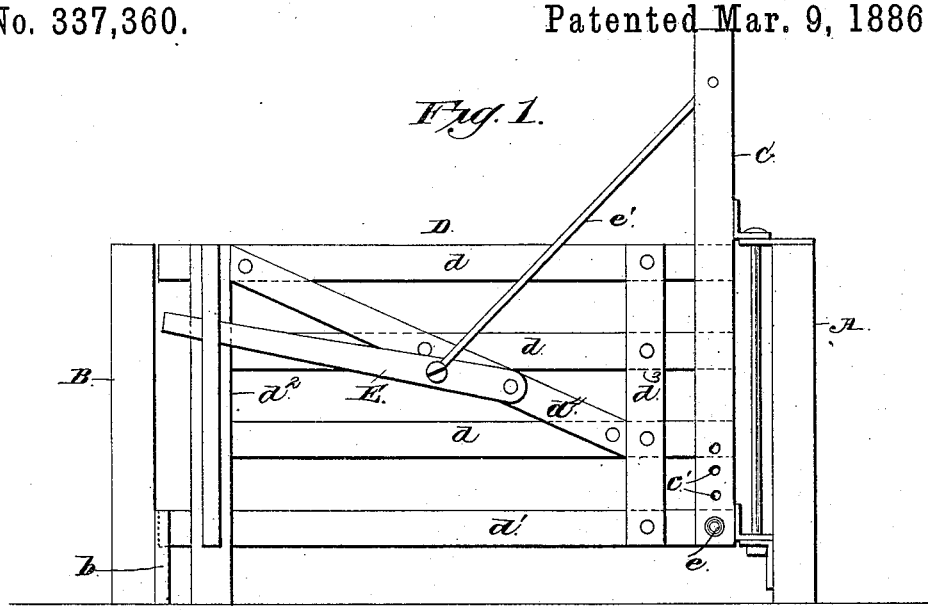
Figure 2:
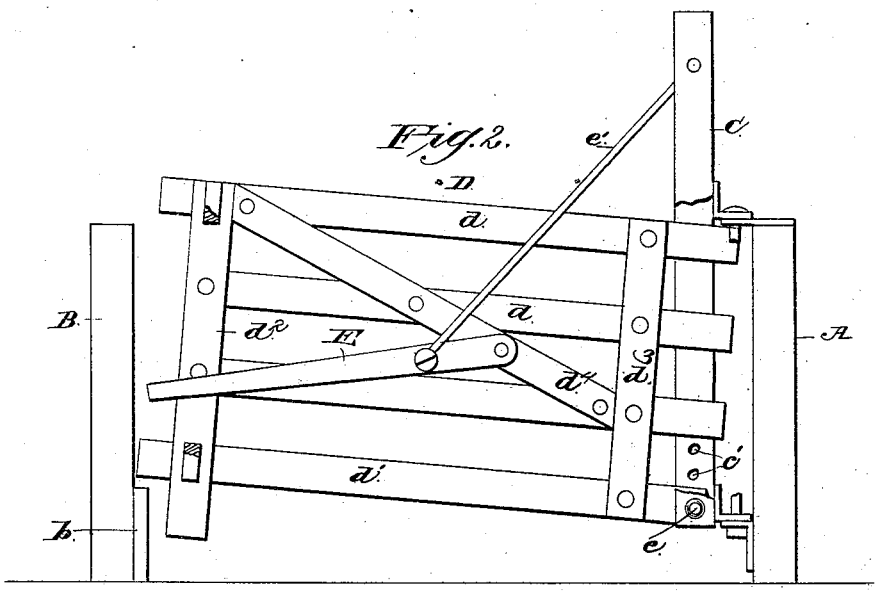
Figure 3:

In the drawings, Figure 1 is a side elevation of our gate. Fig. 2 is a similar view with parts broken away, showing the gate in a raised tilted position. Fig. 3 is a top plan view.

A represents the post to which the gate is hinged, and B represents the post against which the gate closes. The inner side of the lower end of the latter is provided with parallel vertical cleats $b$, between which is formed a recess, $b'$.

C represents an upright, which is hinged to the post A. On one side of this upright, and at a suitable distance therefrom, is secured a keeper, C', a space being left between the upright and the keeper, thus forming a slot to receive the inner ends of the horizontal bars of the gate.

D represents the gate, which is composed of the horizontal bars $d$ $d'$, the vertical depending bar $d^2$ at the outer end, and the vertical bar $d^3$ near the inner end. The inner ends of the bars $d$ $d'$ project beyond the bar $d^3$, and the inner end of the bar $d'$ is pivoted between the upright and the keeper upon a pivotal bolt, $e$. This pivots the gate to the keeper, so that the gate may be tilted or inclined—that is to say, its outer end may be raised or lowered. The upright C projects vertically above the inner end of the gate for a suitable height, and the latter has an inclined brace-bar, $d^4$. To this bar is fulcrumed a lever, E, and a rod, $e'$, is pivoted to the upper end of the upright and attached to the lever. The outer end of the lower bar, $d'$, of the gate projects beyond the said gate, and fits in the recess $b'$ when the gate is closed to lock the latter in that position.

In the lower end of the upright C is a vertical series of openings, $c'$, by means of which the pivotal connection between the gate and the upright may be raised to permit the gate to clear snow-drifts, or for the passage of small animals under the gate.

In order to open the gate, the outer end of the lever is depressed, which raises the outer end of the gate to the position shown in Fig. 2, and clears the bar $d'$ from the recess $b'$, when the gate may be very readily swung open. When the gate is opened and the lever released, the depending end of the bar $d^2$ comes in contact with the ground as the gate lowers, and thus prevents the gate from swinging to a closed position.

No claim is made herein, broadly, to the combination of the hinged support, the gate pivoted thereto, and a lever for raising and lowering the outer end of the gate, as this, we are aware, is not broadly novel.

Having thus described our invention, we claim—

1. The combination of the hinged swinging upright C, having the vertical series of openings $c'$, the gate, the pivotal bolt $e$, to pivot the gate in either of the openings $c'$, to permit the gate to be raised or lowered, for the purpose set forth, and the lever and rod connecting the lever with the upright for tilting the gate, substantially as described.

2. The gate having the vertical bars $d^2$ and $d^3$, and the horizontal rails $d$ and $d'$, having their ends projecting beyond the bars $d^2$ and $d^3$, the vertical swinging hinged upright C, slotted at its lower portion to receive the inwardly-projecting ends of the gate-rails, the bolt $e$, to pivot the lower inner corner of the gate in the slotted upright C, the lever E, pivoted to the gate, the rod $e'$, connecting the said lever with the upright C, to raise and lower the outer end of the gate, and the post B, against which the gate closes, having the recess $b'$ on its inner side, to receive the outwardly-projecting end of one of the gate-rails, and thereby secure the gate when closed, substantially as described.

In testimony that we claim the foregoing as our own we have hereto affixed our signatures in presence of two witnesses.

JOHN T. BALTIMORE.
JOHN F. PADDLEFORD.

Witnesses:
GEO. O. MASON,
F. I. ABORN.